(12) United States Patent
Fedak

(10) Patent No.: US 9,776,118 B2
(45) Date of Patent: Oct. 3, 2017

(54) FILTER ELEMENT AND HOUSING WITH COOPERATING FILTER MEDIA SUPPORT STRUCTURES

(71) Applicant: MANN+HUMMEL GMBH, Ludwigsburg (DE)

(72) Inventor: Erich Fedak, Kalamazoo, MI (US)

(73) Assignee: MANN+HUMMEL GMBH, Ludwigsburg (DE)

( * ) Notice: Subject to any disclaimer, the term of this patent is extended or adjusted under 35 U.S.C. 154(b) by 86 days.

(21) Appl. No.: 14/834,824

(22) Filed: Aug. 25, 2015

(65) Prior Publication Data

US 2016/0051909 A1    Feb. 25, 2016

Related U.S. Application Data

(60) Provisional application No. 62/041,437, filed on Aug. 25, 2014.

(51) Int. Cl.
| | |
|---|---|
| B01D 46/52 | (2006.01) |
| B01D 46/10 | (2006.01) |
| F02M 35/02 | (2006.01) |
| B01D 46/00 | (2006.01) |

(52) U.S. Cl.
CPC ......... *B01D 46/0005* (2013.01); *B01D 46/10* (2013.01); *B01D 46/521* (2013.01)

(58) Field of Classification Search
CPC .. B01D 46/52; B01D 46/106; B01D 46/0001; B01D 46/10; B01D 46/0005; F02M 35/02
USPC .................. 55/320, 315, 357, 498, 499, 502
See application file for complete search history.

(56) References Cited

U.S. PATENT DOCUMENTS

| | | | |
|---|---|---|---|
| 7,998,232 B2 | 8/2011 | Krueger et al. | |
| 2001/0025471 A1* | 10/2001 | Fries | B01D 46/106 55/320 |
| 2009/0151307 A1* | 6/2009 | Zbiral | F02M 35/02 55/315 |
| 2009/0301045 A1* | 12/2009 | Nelson | B01D 46/0001 55/498 |
| 2010/0236204 A1 | 9/2010 | Bouhanna et al. | |
| 2011/0030322 A1 | 2/2011 | Gillispie et al. | |
| 2011/0308213 A1* | 12/2011 | Gillispie | B01D 46/10 55/499 |
| 2012/0110962 A1* | 5/2012 | Dewit | B01D 46/0005 55/357 |
| 2014/0090344 A1 | 4/2014 | Wagner et al. | |
| 2014/0325947 A1 | 11/2014 | Krisko et al. | |

FOREIGN PATENT DOCUMENTS

EP    1843035 B1    8/2012

* cited by examiner

*Primary Examiner* — Jacob T Minskey
*Assistant Examiner* — Minh-Chau Pham
(74) *Attorney, Agent, or Firm* — James Hasselbeck

(57) ABSTRACT

A filter element having a filter media support structure as well as a filter assembly having interacting filter media support structure components are disclosed. The support structure includes a support grid arranged on a clean side of the filter media. At least one support member is secured onto the support grid and extends outwardly away from the support grid and the filter media. The at least one support member is configured and adapted to supportively engage a respective mating support member to transfer forces from the filter element to the housing.

16 Claims, 6 Drawing Sheets

FILTER ELEMENT AND HOUSING WITH COOPERATING FILTER MEDIA SUPPORT STRUCTURES

CROSS REFERENCE TO RELATED APPLICATIONS

This application claims the benefit of U.S. Provisional Patent Application No. 62/041,437 filed Aug. 25, 2014.

TECHNICAL FIELD

The present invention relates to vehicle engine air intake systems and air filters for such systems and, more particularly, to air filters provided with media reinforcing elements.

BACKGROUND OF THE INVENTION

Internal combustion engines require a source of combustion air. A typical source for combustion air is air drawn from outside of the vehicle, which commonly includes particulate contaminants. An air cleaner including an air filter element is normally provided in the air induction system to capture these particulate contaminants before combustion air is delivered to the vehicle engine.

Air filters include filter media having relatively small pores for air flow that operate to inhibit the passage of undesired particulate contaminants. Since the presence of a filter media in the intake air stream acts to restrict air flow, air flow through the filter element necessarily produces a pressure differential or pressure drop between the filter element inlet and outlet surfaces (i.e. across the filter media). This air flow induced pressure drop produces undesirable deflection forces in the filter media of the filter element. These deflection forces are aligned with the air flow direction and, (for example) in panel type air filters, the deflection forces are typically normal to plane defined by the filter element media. The deflection forces tend to distort, deflect or "crown" the filter element. The thickness and material chosen for use as a filter media needs to have filter pores of sufficient size to pass the fluid stream while blocking passage of undesired contaminants. Generally the use of thinner rather than thicker filter media elements may be preferred so as to reduce the pressure drop across the filter.

Air filter elements may be made of pleated filter paper. Pleating the filter paper media increases the available filter surface area, while the pleats additionally serve to reinforce the filter media of the filter element against deformation or deflection due to air flow induced forces. In normal operating conditions this is usually sufficient.

In operation, the filter element is subject to deflection forces induced by airflow through the filter element and the resulting pressure drop across the filter element. These deflection forces may tend to deform the filter element. Accumulation of dust or dirt in the filter media tends to obstruct pores in the filter media and increase the pressure drop with an increase resulting deflection forces. Filter media may absorb water during operation, for example if operated in rainy or dense fog conditions. Water wets the filter media, obstructs pores in the media and may act to further obstruct air flow through the media with the resultant further increase in pressure drop and resultant deflection forces. It is highly desirable to strengthen the filter element against deflection forces to avoid damage to the filter and better secure reliable operation of the air induction system.

SUMMARY OF THE INVENTION

In one aspect of the invention, an improved air filter assembly or air cleaner includes an air filter element having at least one filter media. A peripheral seal frame may be provided and may extend circumferentially about and may be secured to periphery edges of the filter media. A substantially rigid support grid may be provided at the downstream side or clean side of the filter media to strengthen the filter media against deflection forces. In some embodiments the support grid may include at least one substantially rigid side rail arranged at and secured to circumferential periphery portions of the support grid to further strengthen the support grid. In at least some embodiments, at least one support rib may be advantageously provided to extend across the interior face of the of the support grid. The support rib may be advantageously secured at opposing ends to the side rails.

The support grid may include a plurality of frame attachment members spaced apart along, secured to and extend outwardly from the support rails, or may alternately be provided directly on the support grid. The attachment members are configured and adapted to be moldably embedded into the elastic seal material of the seal or seal frame to secure the support grid to the seal frame.

Embodiments of the present invention may include one or more support post receiving members provided on the interior flow face of the plastic support grid, directly supporting the support grid and filter media within the filter housing to absorb and resist airflow induced deflection forces on a flow face of the filter media and the support grid. The support post receiving members engage and may lockably engage with support posts formed on or secured onto an interior of the filter housing cover or base. The engagement of the support posts with the support post receiving members of the filter element provides support to the filter media, resisting deformation of the media and possible collapse of the filter element, due to, for example, an excessive differential pressure across the filter element. The filter media may be a pleated filter media.

The support post receiving members and/or the support posts may be provided with a cushioning member, such as a polyurethane gasket, which may be overmolded onto or arranged over or on the support post receiving members and/or the support posts. The cushioning member is advantageously operative to mitigate and reduce issues with noise and vibration due to movement or vibration between the support post receiving members and the support posts during operation.

Embodiments of the present invention may include a filter element for filtering gas or liquid having a dirty side at an inlet side of the filter element and an opposing clean side at an outlet side of the filter element. The filter element includes at least one filter media for filtering a gaseous or liquid fluid. The filter media is supported by a filter media support structure having a support grid arranged on a clean or downstream side of the filter media. The support grid may have a plurality of side rails provided along periphery portions of the support grid and may have a plurality of support rib spanning between and secured onto the plurality of side rails with the support rubs intersecting to form apertures for fluid flow through the support grid.

Advantageously, at least one support member is secured onto the support grid at the clean side of the filter media and may extend axially outwardly away from the support grid and the filter media. The at least one support member is configured and adapted to supportively engage a respective mating support member when received into a filter housing. A peripheral seal of an elastic sealing material may be provided, the peripheral seal may extend circumferentially around a radial periphery of the filter media and may be secured directly or indirectly to the filter media, the peripheral seal operable to sealably separate the clean side from the dirty side of the filter element when in an installed state.

In another aspect of the invention, the support grid includes a plurality of securing projections extending radially outwardly from the support grid. The securing projections are secured to or embedded into the peripheral seal or a support flange of the filter element thereby securing the support grid and filter media together as a one-piece exchangeable filter element.

In another aspect of the invention, the at least one support member is embodied as at least one tubular socket arranged on and secured onto the support grid.

In another aspect of the invention, the at least one support member is at least one support post arranged on and secured onto the support grid.

In another aspect of the invention, the at least one support member includes an annular cushioning member of an elastomeric material overmolded onto or arranged on the at least one support member. In a tubular socket, the elastomeric material may be overmolded onto or arranged on the end of the socket into which the support post is received. The annular cushioning member may be arranged on the interior wall socket. In a support post, the annular cushioning member of an elastomeric material overmolded onto or arranged on or encircling the exterior surface of post. The annular cushioning member is positioned on the at least one support member to be arranged between the at least on support member and the at least one mating support member to cushion contact or movement between the at least one support member and the at least one mating support member.

In another aspect of the invention, the filter element includes a support frame or seal frame secured to and extending circumferentially around a radial periphery of the filter media. Preferably the seal frame is substantially rigid, such of a molded plastic resin. The peripheral seal is preferably arranged on and supported directly on the seal frame.

In another aspect of the invention the filter media may include a pleated filter media having zig-zag folds.

The above features and advantages and other features and advantages of the present invention are readily apparent from the following detailed description of the best modes for carrying out the invention

BRIEF DESCRIPTION OF THE DRAWINGS

Further advantages and expedient embodiments may be taken from the claims, the figure description, and the drawings.

In the Figures the same components are identified with same reference numerals. Similar components are identified by reference numbers incremented by 100.

DESCRIPTION OF THE PREFERRED EMBODIMENTS

Figure 1:
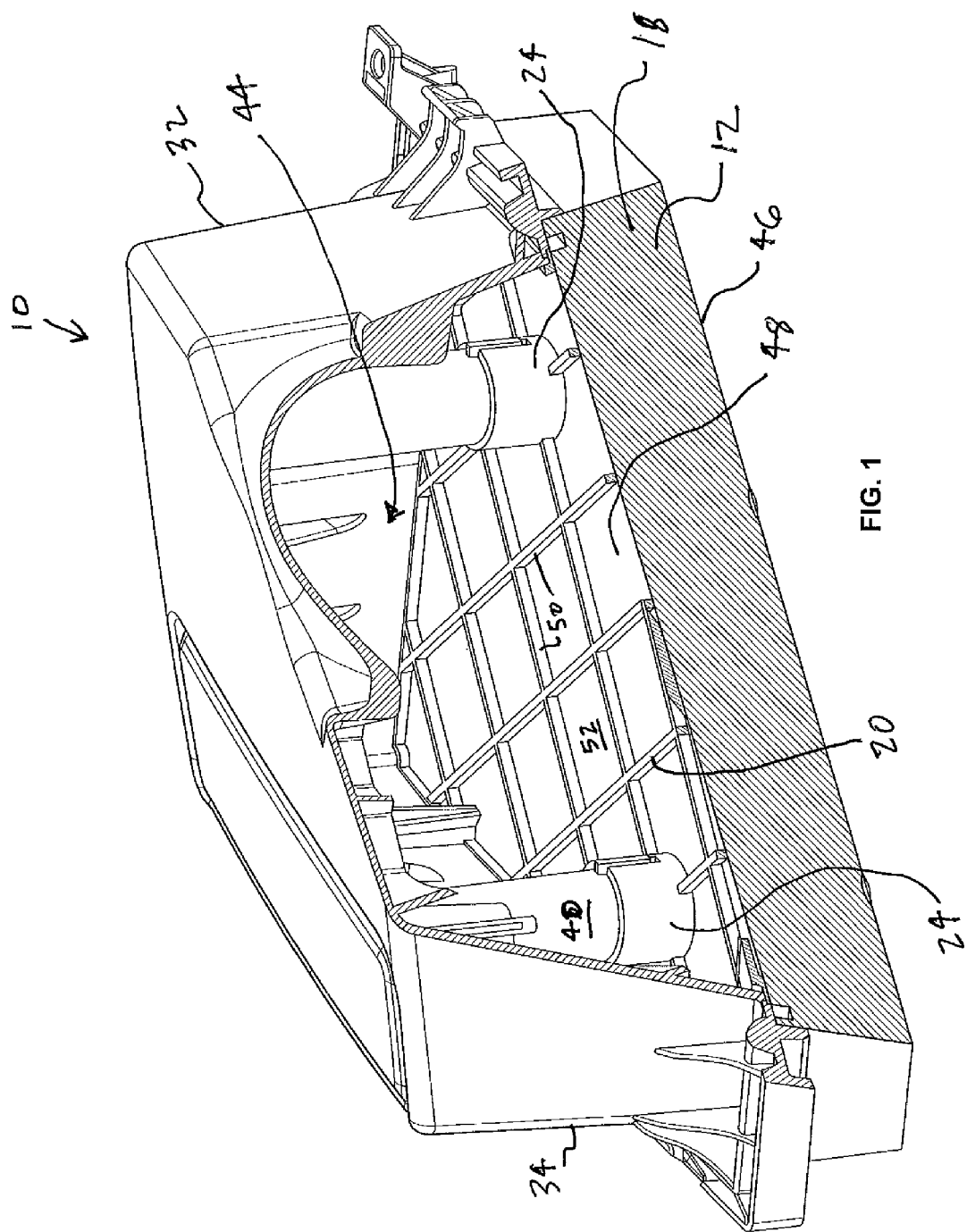
FIG. 1 is section view of a filter element and a half portion of the filter housing incorporating a filter media support structure, consistent with the present invention.

FIGS. 1-4 depict a preferred embodiment of the filter element support structure, consistent with the disclosed invention. FIG. 1 shows perspective cut-away or section view of the a filter assembly 10 having a filter element 12 installed into and supportively interacting with and a half portion of a filter housing 32 depicting features of a filter media support structure consistent with the present invention.

The half portion 34 of the filter housing 32 may be a housing cover or a housing base. The half portion 34 of the filter housing 32 is configured to mate with a second half portion of the filter housing (not shown) to enclose an interior chamber 44 into which the filter element 12 is replaceably or exchangeably received. The filter element 12 has an inflow face 46 arranged at a dirty side of the filter element 12 and an axially opposing outflow face 48 arranged at a clean side of the filter element. An axial direction is defined as the direction that the outflow face 48 is spaced away from the inflow face 46. The filter element 12 sealably divides the interior chamber 44 into a clean side and a dirty side such the flow from the clean side to the dirty side must be filtered through the filter element 12.

A substantially rigid support grid 20 is arranged at or on the filter media 18 at the outflow face 48 of the filter element 12. By substantially rigid we mean the support grid is a materials selected to have sufficient rigidity to provide support the 18 filter media 18 against fluid forces without undue flexure of the support grid or filter media. Preferably the filter media is a zig-zag pleated filter media of cellulose, or a woven or non-woven synthetic fibers, or porous filter media blocks such as foam block, or combinations thereof, although other types of filter media may be used as known to those skilled in the art. The invention is not limited to the filter media type chosen.

Preferably, the support grid is a grid structure of a plurality of intersecting elongated grid members 50 forming a mesh or grid defining a plurality of flow apertures 52 extending through the support grid 20. Alternately, the support grid may be a plate-like structure having flow apertures or slots extending through the plate—like structure. Other support grid embodiments are possible as is readily understood by those skilled in the art.

Preferably, the support grid is an injection molded component of a plastic resin material, although this is not limiting. The support grid may also be of other suitable substantially rigid materials, stamped or expanded sheet metal for one example.

The outflow face is arranged at or on the support grid, the outflow face 48 receiving support to absorb deflection forces induced on the filter media 18, such as by fluid flow or to support the weight of the filter media 18. Arranged on the support grid at the outflow face 48 are one or more support post receiving members 24. Preferably the support post receiving members are formed with the support grid 20 as a unitary one piece component. The support post receiving members 24 may be configured at a socket 24 as shown, although other configurations are also envisioned as discussed further below.

The filter housing half portion, such as the housing cover 34 includes one or more support posts 40 arranged at and preferably formed with or secured onto an interior wall of the housing half portion, such a housing cover 34. The support posts 40 may be integrally molded with the housing half port 34 such as to form a unitary one-piece housing cover or alternately housing base. The support post receiving members 24 are arranged to supportively engage with respective ones of the support posts 40 to transfer deflection forces from the filter element 12 and filter media 18 to the housing 32. Preferably the elongated grid members 50 extend fully across the outflow face 48 of the filter element 12.

As shown in FIG. 1, in some embodiments, one or more support post receiving members 24 are provided on, formed with or secured onto the support grid 20 and may protrude axially outwardly from the support grid 20 and filter media 18. The one or more support post receiving members 24 may advantageously be configured as a socket 24, for example a tubular socket 24 having an interior into which a tip portion of the support post 40 is received and captured or engaged. Preferably, the support post receiving members 24 are molded together with the support grid forming a unitary one-piece component. The support grid is preferably permanently secured onto the filter element together with the filter media so as to be a one-piece component, as an exchangeable filter element 12. In other embodiments, the support grid 20 may be a separate component connected to arranged on and detachable from the filter element 12.

The filter element 12 preferably includes a peripheral seal 28 of an elastic sealing elastomer extending circumferentially around the radial periphery of the filter media 18. The seal 28 is configured contact and close against the filter housing 32 and seal between the filter element 12 and the housing 32 to effectively seal the clean side from the dirty side of the filter element 12, sealably separating the interior chamber 38 into a clean side and a dirty side. The seal 28 may be realized as an elastomer, for one example a PUR foam, which may be molded onto or adhesively secured to the filter media 18. In some embodiments, the seal 28 may be arranged on, may be support directly on and may be secured onto a seal frame 30 that also extends circumferentially around the periphery of the filter media 18 of the element 12

Figure 2:
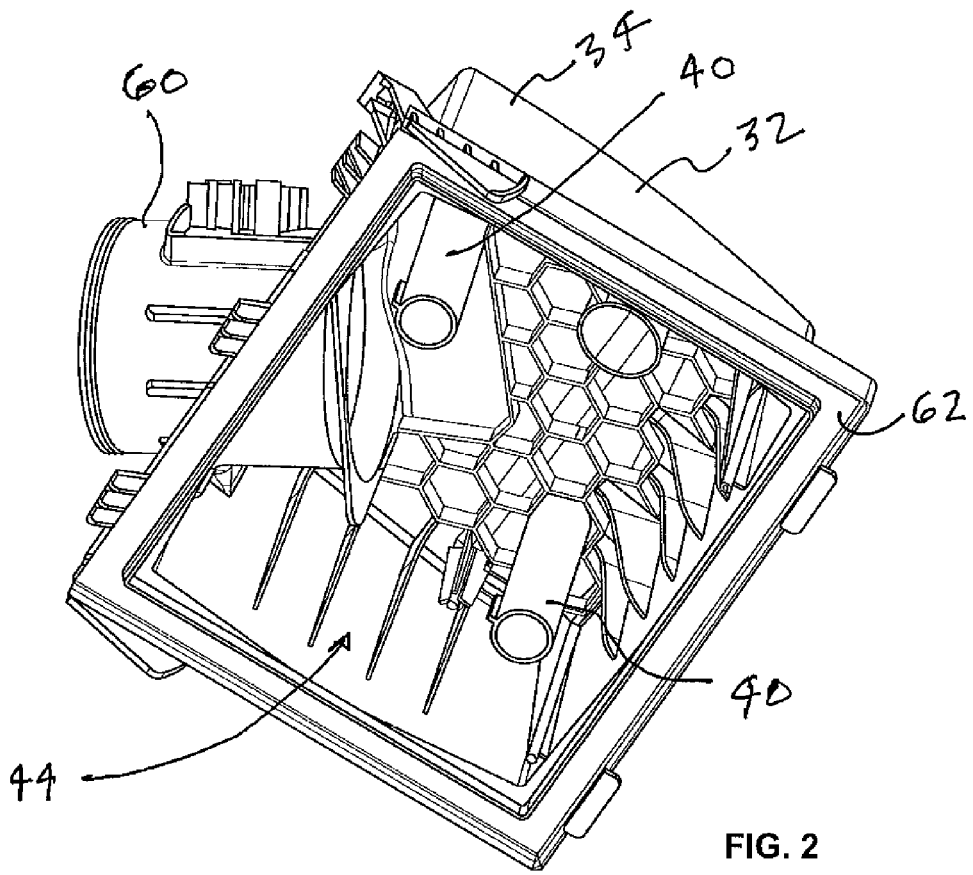
FIG. 2 is view looking into the interior of a filter housing cover incorporating features of a filter media support structure, consistent with the present invention.

FIG. 2 presents a view of a half portion 34 of the filter housing 32 looking into the interior of a filter housing 32. The half portion may be considered as the filter housing cover or the filter housing base. The filter housing 32 half portion 34 may include an outlet port 60 configure to connect to an air intake tract (not shown) to deliver filter air. As shown in FIG. 2, one or more support posts 40 are secured to or integrally formed with the housing half portion 34 and extend axially inwardly into the interior chamber 44 in an axial direction to engage with the correlated support post receiving members 24. The housing half portion 34 preferably includes a peripheral seal flange 62 configured to seal against the seal 28 of the filter element.

Figure 3:
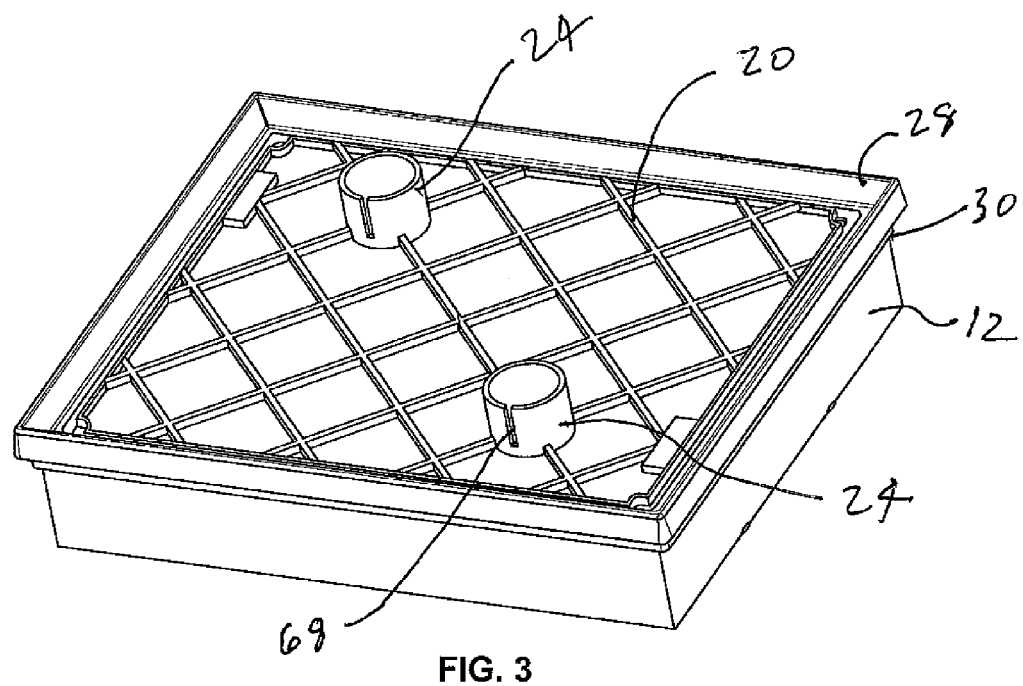
FIG. 3 is a perspective view of a rectangular filter element and support grid incorporating features of a filter media support structure, consistent with the present invention.

FIG. 3 is a perspective view of a rectangular filter element 12 and support grid 20 better illustrating previously discussed features of the filter element 12. In FIG. 3, the filter element 12 includes a support grid 20 arranged on the outflow face 48 of the filter media 18 and covering the outflow face 48 of the filter media. Arranged on the support grid 20 are one or more support post receiving members 24, as discussed earlier. As shown the support port receiving members may include axial slots in the wall of the support post receiving members to allow for expansion of the support post receiving members 24 when the support post 40 is received therein. Clearly shown is the circumferentially extending peripheral seal 28 arranged on a seal frame 30. The seal frame is preferable a mold plastic, such as a substantially rigid molded plastic frame or alternately an elastomeric frame, the seal frame 30 is secured to the periphery of the filter media. The seal frame is an optional component. The seal, for example may be arranged directly on and molded or secured onto the periphery edges of the filter media, or may be formed with or secured onto the support grid 20.

Figure 4:
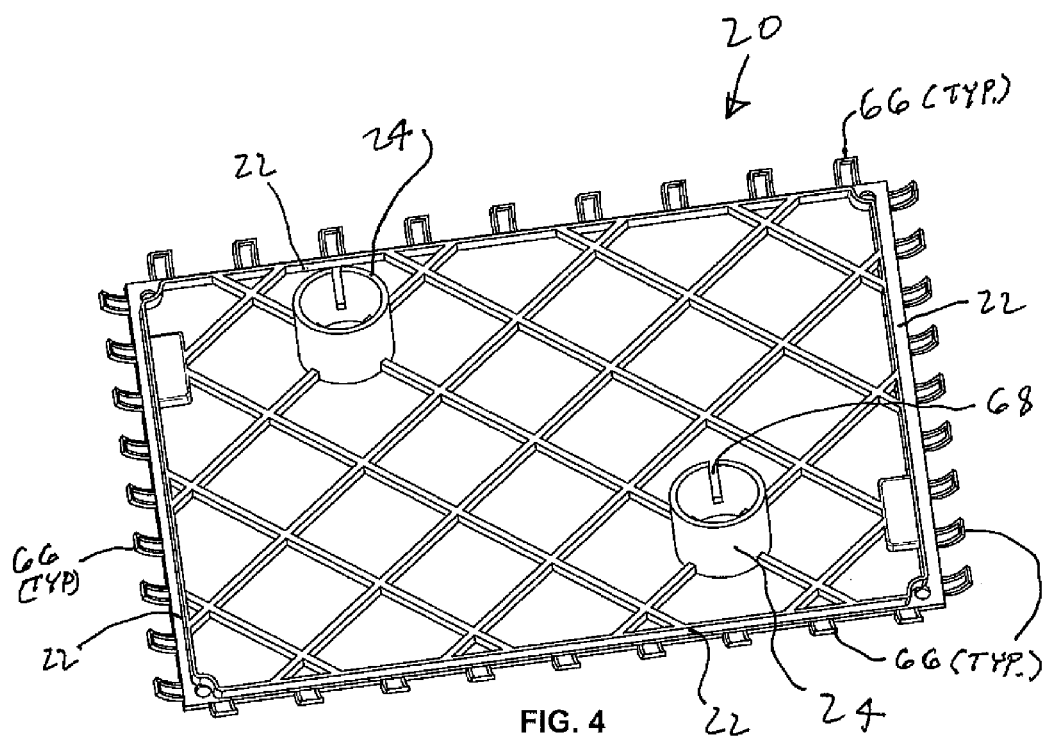
FIG. 4 is a perspective view of a substantially rigid support grid incorporating features of a filter media support structure, consistent with the present invention.

FIG. 4 is a perspective view of a substantially rigid support grid 20 alone, formed and adapted to be secured into the seal 28 and/or seal frame 14 to form a complete filter element 12. The support grid 20 shows the one or more support post receiving members 24 extending axially outwardly away from the support grid 20. A plurality of securing projections 66 may be provided on the radial periphery of the support grid, preferably formed with and secured to side rails 22 of the support grid 20. The securing projections 66 may be formed as a plurality of U-shaped projections extending radially outwardly from the side rails 22 and configured to be embedded into the seal 28 of the filter element, the embedding permanently securing the support grid to the filter element 12. Other types of securing projections (other than U-shaped) may be used within the invention. U-shaped projections are preferred as they may be easily embedded into the elastic material of the seal 28 to secure the substantially rigid support grid 20 onto the filter element 12.

FIGS. 5-8 depict a related second embodiment of the filter element support structure, consistent with the disclosed invention. FIGS. 5-8 differ from FIGS. 1-4 in that the one or more support posts 154 are provided on the support grid 120 and the one or more support post receiving members 124 are provided on or formed integrally on the interior of the filter housing 132.

The half portion 134 of the filter housing 132 may be a housing cover or a housing base. The half portion 134 of the filter housing 132 is configured to mate with a second half portion of the filter housing (not shown) to enclose an interior chamber 44 into which the filter element 112 is replaceably or exchangeably received. The filter element 112 has an inflow face 146 arranged at a dirty side of the filter element 112 and an axially opposing outflow face 148 arranged at a clean side of the filter element 112. As before, an axial direction is defined as the direction that the outflow face 148 is spaced away from the inflow face 146.

A substantially rigid support grid 120 is arranged at or on the filter media 118 at the outflow face 148 of the filter element 112. Again, by substantially rigid we mean the support grid is a materials selected to have sufficient rigidity to provide support the filter media 118 against fluid forces without undue flexure of the support grid 120.

Preferably, the support grid 120 is a grid structure of a plurality of intersecting elongated grid members 150 forming a mesh or grid defining a plurality of flow apertures 152 extending through the support grid 120. Alternately, the support grid may be a plate-like structure having flow apertures or slots extending through the plate-like structure. Other support grid embodiments are possible as is readily understood by those skilled in the art.

Preferably, the support grid 120 is an injection molded component of a plastic resin material, although this is not limiting. The support grid may also be of other suitable substantially rigid materials, stamped or expanded sheet metal for one example.

The outflow face 148 is arranged at or on the support grid 120, the outflow face 148 receiving support to absorb deflection forces induced on the filter media 118, such as by fluid flow or to support the weight of the filter media 118. Arranged on the support grid at the outflow face 148 are one or more axially outwardly extending support posts 154. The support posts 154 may be configured as a tubular projection as shown, although other configurations are also envisioned as discussed further below.

The filter housing half portion 134 includes one or more support post receiving members 124 arranged at and preferably secured onto or integrally formed with an interior wall of the housing half portion 134. The support post receiving members 124 may be integrally molded with the housing half port 134 such as to form a unitary one-piece housing half portion, i.e. cover or base. The support post receiving members 124 are arranged to supportively engage with respective ones of the support posts 154 to transfer deflection forces from the filter element 112 and filter media 118 to the housing 132.

Figure 5:
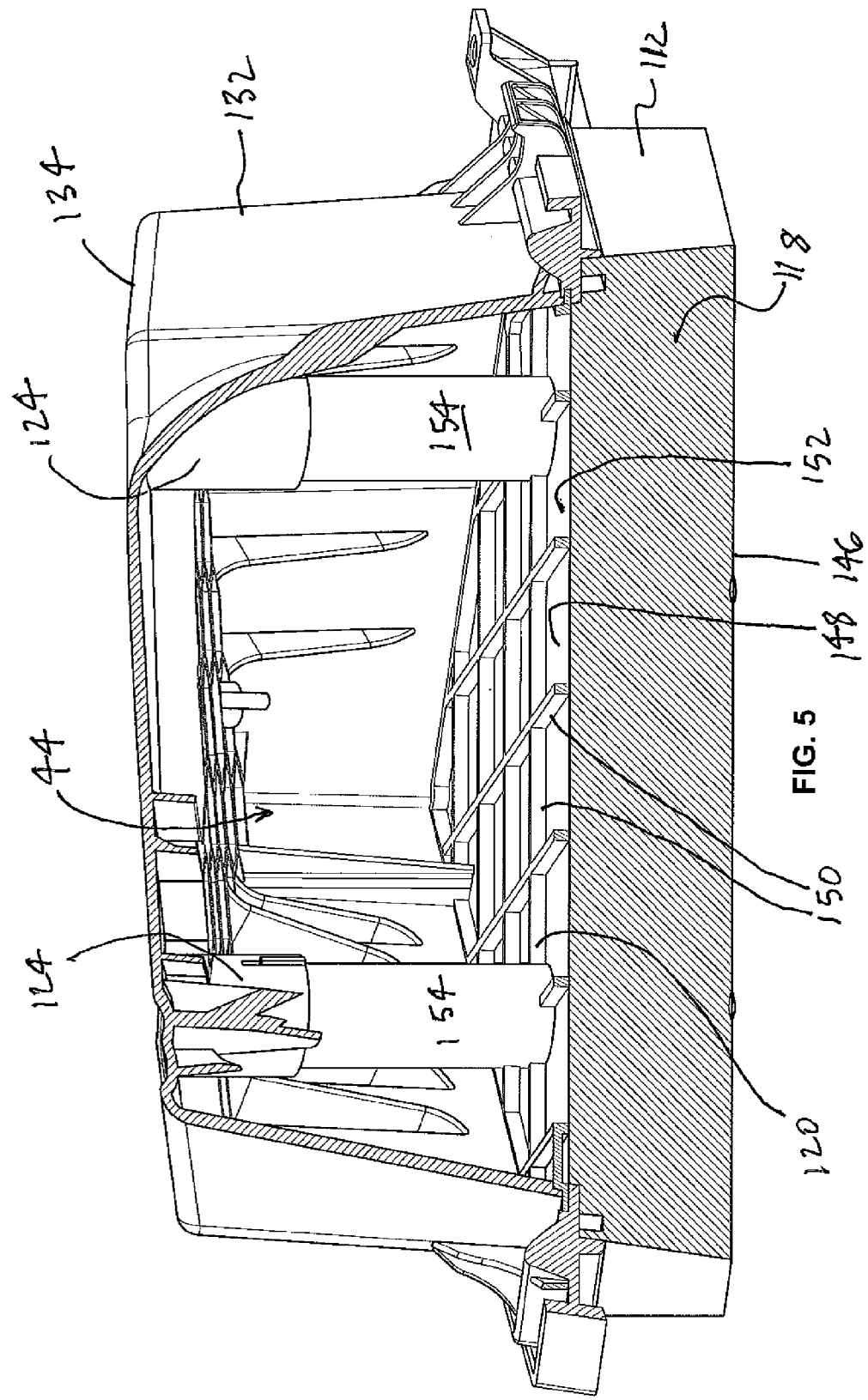
FIG. 5 is section view of a second embodiment of the filter element and a half portion of the filter housing incorporating a filter media support structure, consistent with the present invention.

As shown in FIG. 5, in some embodiments, one or more support posts 154 are provided on the support grid 120 and may protrude axially outwardly from the support grid 120. The one or more support posts 154 may advantageously be configured as a tubular member, for example a tubular hollow tubular projection 154 having a tip configured to engage into and be received into a mating support post receiving member 124. Preferably, the support posts 154 are molded together with the support grid 120 forming a unitary one-piece component. The support grid 120 is preferably permanently secured to the filter element with the filter media so as to be a one-piece component with the exchangeable filter element 112. In other embodiments, the support grid 120 may be a separate component connected to and detachable from the filter element 112.

The filter element 112 preferably includes a peripheral seal 128 of elastomeric material extending circumferentially around the periphery of the filter media. The seal 128 is configured contact the filter housing 132 and seal between the filter element 112 and the housing 132 to effectively seal the clean side from the dirty side of the filter element and interior chamber. The seal 128 may be realized as an elastomer, for one example a PUR foam, which may be molded onto or adhesively secured to the filter media. In some embodiments, the seal 128 may be arranged for support directly on and may be secured to a seal frame 130 that also extends circumferentially around the periphery of the filter element and is secured to peripheral edges of the filter media 118.

Figure 6:
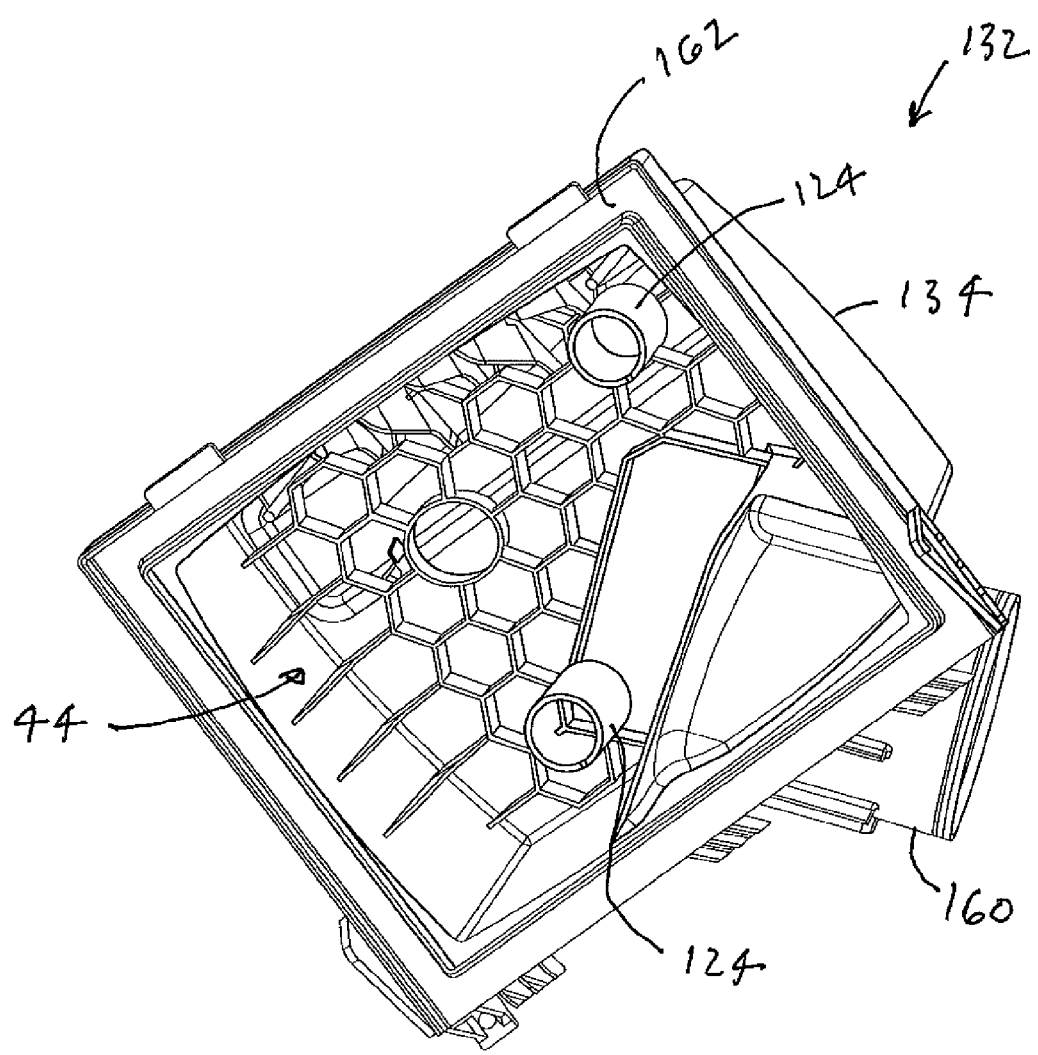
FIG. 6 is view looking into the interior of a filter housing cover according to the second embodiment, incorporating features of a filter media support structure, consistent with the present invention.

FIG. 6 presents a view of a half portion 134 of the filter housing 132 looking into the interior of a filter housing 132. The half portion 134 may be considered as the filter housing cover or the filter housing base. The filter housing 132 half portion 134 may include an outlet port 160 configure to connect to an air intake tract to deliver filter air. As shown in FIG. 6, one or more support post receiving members 124 are secured to or integrally formed with the housing half portion 134 and may extend axially inwardly into the interior chamber 44 in an axial direction to engage with the correlated support posts 140. The housing half portion 134 may include a peripheral seal flange 162 configured to seal against the seal 128 of the filter element 112.

Figure 7:
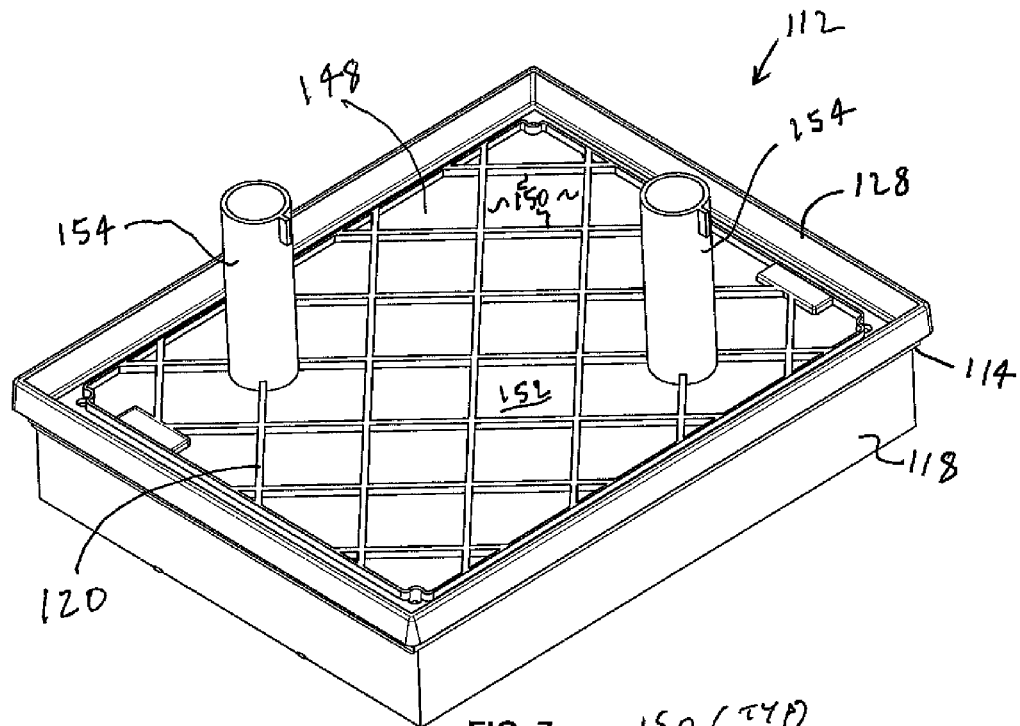
FIG. 7 is a perspective view of a second embodiment of a rectangular filter element and support grid incorporating features of a filter media support structure, consistent with the present invention.

FIG. 7 is a perspective view of a rectangular filter element 112 and support grid 120 better illustrating previously discussed features of the filter element 112. In FIG. 7, the filter element 112 includes a support grid 120 arranged on the outflow face 148 of the filter media 118 and covering the outflow face 148 of the filter media 18. Arranged on the support grid 120 are one or more support posts 154 extending axially outwardly away from the support grid 120 and filter media 118.

Figure 8:
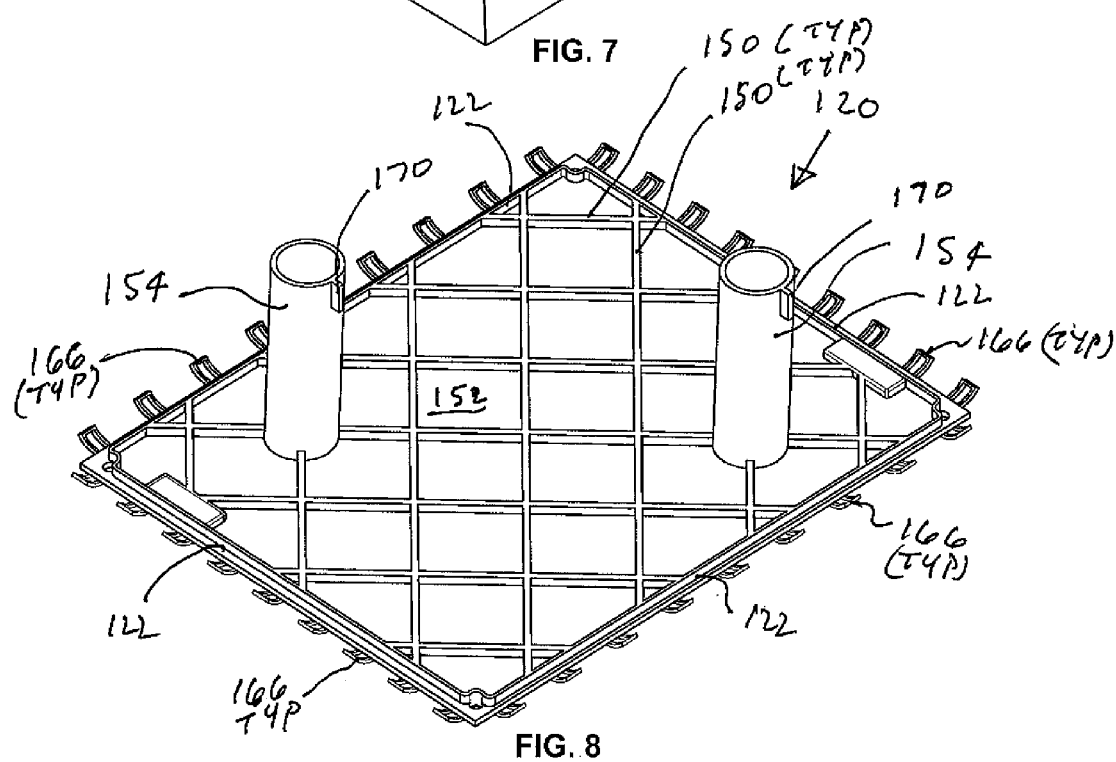
FIG. 8 is a perspective view of a substantially rigid support grid incorporating features of a filter media support structure, consistent with the present invention.

FIG. 8 is a perspective view of a substantially rigid support grid 120 formed and adapted to be secured into the seal and/or seal frame to form a complete filter element 112. The support grid 120 shows the one or more support posts 140 extending axially outwardly away from the support grid 120. As shown best in FIG. 8, the support posts 154 or 40 may include a radially projection rib 170 on the outer surface of the support posts 154 or 40. The radially projecting rib may advantageously engage into the slot 168 of the support post receiving member 124 so as to capture and properly align the filter element into the support post receiving member 124 of the housing. These feature are also intended for the embodiment of FIGS. 1-4.

A plurality of securing projections 166 may be provided on the radial periphery of the support grid 120, secured to side rails 122 of the support grid 120. The securing projections 166 may be formed as a plurality of U-shaped projections extending radially outwardly from the side rails 122 and configured to be embedded into the seal 128 of the filter element, the embedding permanently securing the support grid 120 to the filter element 112.

It should be understood, of course, that the foregoing relates to exemplary embodiments of the invention and that modifications may be made without departing from the spirit and scope of the invention as set forth in the following claims.

What is claimed is:

1. A filter assembly comprising:
a filter housing including:
an interior chamber;
a filter element for filtering gas or liquid having a dirty side at an inlet side of the filter element and an opposing clean side at an outlet side of the filter element, the filter element received into the interior chamber, the filter element including:
at least one filter media;
wherein an axial direction is defined as a direction normal to a plane of the clean side of the filter media;
a filter media support structure including:
a support grid arranged on a clean side of the filter media, the support grid including:
a plurality of side rails provided on an outer periphery of the support grid, framing the support grid;
a plurality of support ribs arranged interior to and surrounded by the frame formed by the plurality of side rails, the plurality of support ribs spanning between and secured onto the plurality of side rails, the support ribs intersecting to form apertures for fluid flow through the support grid; and
at least one axially elongated first support member arranged at the clean side, having a first end secured directly onto the plurality of support ribs, the first end spaced inwardly away from the plurality of side rails and spaced inwardly away from the outer periphery of the support grid, the at least one first support member extending axially outwardly away from the support grid and filter media to an opposing second end;

at least one complimentary second support member having a first end secured onto an interior surface of the filter housing and extending axially inwardly away from the interior surface to an opposing second end such that the opposing second end of the at least one second support member is aligned and configured to supportively engage respective opposing second ends of the at least one first support member, wherein the at least one first support member is detachably engaged onto the at least one complimentary second support member to support the filter element in the housing and transfer forces from the filter element to the housing.

2. The filter assembly according to claim 1 wherein, the support grid is secured onto the filter media forming a unitary exchangeable filter element.

3. The filter assembly according to claim 1, further comprising:

a peripheral seal of an elastic sealing material, the peripheral seal extending circumferentially around a radial periphery of the filter media and secured directly or indirectly to the filter media;

wherein the peripheral seal sealably contacts the filter housing and, with the filter media, separates a clean side of the interior chamber from a dirty side of the interior chamber.

4. The filter assembly according to claim 3, further comprising:

a seal frame extending circumferentially around a radial periphery of the filter media;

wherein the peripheral seal is arranged on and supported on the seal frame.

5. The filter assembly according to claim 3, wherein the support grid includes a plurality of securing projections extending radially outwardly from the support grid;

wherein the securing projections are embedded into the peripheral seal, securing the support grid to the peripheral seal.

6. The filter assembly according to claim 1, wherein the at least one first support member is at least one tubular socket having the first end arranged on and secured directly onto the support grid, the first end spaced inwardly away from the plurality of side rails and spaced inwardly away from the outer periphery of the support grid, the at least one tubular socket extending axially outwardly away from the support grid and filter media to the opposing second end;

the at least one complimentary support member is at least one support post arranged on and secured onto the interior of the filter housing;

wherein the at least one support post is sized and configured to engage into the opposing second end of respective ones of the at least one tubular socket to transfer forces from the filter element to the housing.

7. The filter assembly according to claim 1, wherein the at least one first support member is at least one tubular socket arranged on and secured onto the interior of the filter housing;

the at least one complimentary support member is at least one support post arranged on and secured onto the support grid;

wherein the at least one support post is sized and configured to engage into respective ones of the at least one tubular socket to transfer forces from the filter element to the housing.

8. The filter assembly according to claim 1, further comprising:

an annular cushioning member of an elastomeric material overmolded onto or arranged on the at least one first support member or the at least one complimentary support member;

wherein the annular cushioning member is arranged between and contacting the at least one first support member and the at least one complimentary support member to cushion contact or movement between the at least one first support member and the at least one complimentary support member.

9. The filter assembly according to claim 1, wherein the filter media is a pleated filter media having zig-zag folds.

10. A filter element for filtering gas or liquid having a dirty side at an inlet side of the filter element and an opposing clean side at an outlet side of the filter element, the filter element comprising:

at least one filter media;
wherein an axial direction is defined as a direction normal to a plane of the clean side of the filter media;

a filter media support structure including:
a support grid arranged on a clean side of the filter media, the support grid including:
a plurality of side rails provided on an outer periphery of the support grid, framing the support grid;
a plurality of support ribs arranged interior to and surrounded by the frame formed by the plurality of side rails, the plurality of support ribs spanning between and secured onto the plurality of side rails, the support ribs intersecting to form apertures for fluid flow through the support grid; and
at least one axially elongated support member arranged at the clean side, having a first end secured directly onto the plurality of support ribs, the first end spaced inwardly away from the plurality of side rails and spaced inwardly away from the outer periphery of the support grid, the at least one support member extending axially outwardly away from the support grid and filter media to an opposing second end;

wherein the opposing second end of the at least one support member is configured and adapted to supportively engage a respective at least one mating support member when received into a filter housing;

a peripheral seal of an elastic sealing material, the peripheral seal extending circumferentially around a radial periphery of the filter media and secured directly or indirectly to the filter media;

wherein the peripheral seal is operable to sealably separate the clean side from the dirty side of the filter element when in an installed state.

11. The filter element according to claim 10, wherein the support grid includes a plurality of securing projections extending radially outwardly from the support grid;

wherein the securing projections are embedded into the peripheral seal, securing the support grid to the peripheral seal and filter media as a one-piece exchangeable filter element.

12. The filter element according to claim 10, wherein the at least one support member is at least one tubular socket having the first end arranged on and secured directly onto the support grid, the first end spaced inwardly away from the plurality of side rails and spaced inwardly away from the outer periphery of the support grid, the at least one tubular socket extending axially outwardly away from the support grid and filter media to the opposing second end.

13. The filter element according to claim 10, wherein the at least one support member is at least one support post having the first end arranged on and secured directly onto the support grid, the first end spaced inwardly away from the plurality of side rails and spaced inwardly away from the outer periphery of the support grid, the at least one support post extending axially outwardly away from the support grid and filter media to the opposing second end.

14. The filter element according to claim 10, wherein the at least one support member includes an annular cushioning member of an elastomeric material overmolded onto or arranged on the at least one support member;

wherein the annular cushioning member is positioned on the at least one support member to be arranged between the at least on support member and the at least one mating support member to cushion contact or movement between the at least one support member and the at least one mating support member.

15. The filter element according to claim 10, further comprising:

a seal frame secured to and extending circumferentially around a radial periphery of the filter media;

wherein the seal frame is substantially rigid;

wherein the peripheral seal is arranged on and supported on the seal frame.

16. The filter element according to claim 10, wherein the filter media is a pleated filter media having zig-zag folds.

* * * * *